Patented Nov. 6, 1934

1,979,450

UNITED STATES PATENT OFFICE 1,979,450

PREPARATION OF ORGANIC ACIDS

Gilbert B. Carpenter, Wilmington, Del., assignor, by mesne assignments, to E. I. du Pont de Nemours & Company, Wilmington, Del., a corporation of Delaware No Drawing. Application February 28, 1931, Serial No. 519,239

18 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst, acetic acid, methyl acetate, and methyl formate may be prepared in proportions which are governed by the particular operating conditions. Acids have likewise been prepared from methane and carbon monoxide, from carbon monoxide and water vapor, and from ethers and carbon monoxide. Investigators have experienced considerable difficulty in their attempts to find, for these reactions, a catalyst which under given operating conditions would produce a good yield of the acid or other compound desired. Some of the catalysts which have been suggested include the hydrogenating and hydrating catalysts alone or in combination, metal acetate catalysts which split off acetic acid under 450° C., and acid catalysts, such as phosphoric acid and its acid salts.

There are numerous disadvantages in the employment of the before-mentioned catalysts, however. For instance, when the hydrogenating and hydrating catalysts are employed, particularly if acetic acid is the desired end product, but low yields of that acid result. With the metal acetate catalysts which decompose and split off acetic acid, frequent reactivation is required which renders their use uneconomical from the commercial standpoint. When the liquid acid catalysts are utilized, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of aliphatic alcohols with carbon oxides in the presence of a catalyst. Another object of this invention is to provide a process for the preparation of acids having the structural formulæ—$C_nH_{2n+1}COOH$—from alcohols having the structural formulæ—$C_nH_{2n+1}OH$—by subjecting the alcohols to the action of carbon monoxide in the presence of a promoted charcoal catalyst. A still further object of this invention is to provide a process for the preparation of acetic acid by the interaction of methanol and carbon monoxide in the presence of a charcoal catalyst promoted with an inorganic acid and/or an inorganic acid salt. Other objects will hereinafter appear.

According to the present invention organic acids are prepared by interaction of the aliphatic alcohols and carbon monoxide by passing these vaporized alcohols together with the carbon monoxide over an activated charcoal catalyst promoted with the inorganic acids, and inorganic acid salts, such as phosphoric acid, arsenious acid, calcium acid phosphate, etc., or in fact any compound the acidity of which is due to the presence of a titratable hydrogen ion. The thus promoted charcoal catalyst may be supported or not on silica gel, kieselguhr or other similar inert material.

The charcoal catalyst is not to be confused with inorganic catalysts supported on charcoal. In the latter case the catalytic effect of the charcoal is negligible due to the fact that its surface has been coated with a contiguous covering of the catalytic constituent which alone is acting as the catalyst for the reaction. On the other hand, when using charcoal as a catalyst and promoted in accord with the present invention, the charcoal is the dominating influence in the catalyst and the surface and configuration of the charcoal per se aided by the material added as a promoter results in a catalyst which has a much greater activity for the alcohol carbon monoxide reaction than, for example, the same promoting material supported on the charcoal.

The alcohol-carbon monoxide reactions which can be accelerated by the above described catalysts may be expressed as follows:

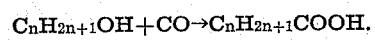
$$C_nH_{2n+1}OH + CO \rightarrow C_nH_{2n+1}COOH.$$

In accordance with the particular operating conditions, it will be found that, in some instances, the acid may not be formed directly in the free state, but may be produced as an ester by condensation of the acid formed with the particular alcohol used in the process, as indicated below:

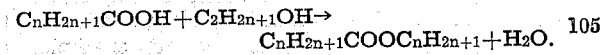
$$C_nH_{2n+1}COOH + C_2H_{2n+1}OH \rightarrow C_nH_{2n+1}COOC_nH_{2n+1} + H_2O.$$

The alcohol used may be replaced, if desired, wholly or partly by the corresponding alkyl ethers of the alcohol, such as dimethyl ether, diethyl ether, or the mixed alkyl ethers, the alkyl esters, or other compounds containing one or more hydrolyzable alkoxy groups.

The synthesis can generally be efficiently carried out under the following operating conditions. The pressure may vary from approximately 25 atmospheres to 900 atmospheres or higher with the preferable operating range in the neighborhood of 350–700 atmospheres. The temperature within the reaction zone is quite critical as it determines to a large extent the product obtained. For example, when the methanol-carbon monoxide reaction is conducted at temperatures below 300° C. a low yield of methyl acetate will be obtained. While, on the other hand, at temperatures above 300° C. the yield of methyl acetate will increase with a corresponding decrease in the proportion of the parasitic products.

The carbon monoxide used may be obtained from various commercial sources, such, for example, as from water gas, producer gas, coke oven gas, and the like, but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohol and carbon monoxide on one pass through the conversion apparatus. Other strictly inert gases will usually act similarly to nitrogen. It is, of course, understood that instead of introducing methanol itself into the reaction chamber substances or mixtures of substances which decompose to form alcohols or esters may be employed, but generally I prefer to introduce methanol directly into the gas stream leading to the converter.

My process can be conveniently carried out by passing purified carbon monoxide into methanol preferably containing water, maintained at such a temperature that the issuing gases will have the requisite proportion of methanol, carbon monoxide and water vapor. I have found that a gaseous composition, containing an excess of carbon monoxide over the methanol vapor, will give a good yield of acetic acid and ester on one pass through a converter containing my catalyst,—the temperature of the reaction chamber being maintained at approximately 300° C. and pressure held in the neighborhood of 350 atmospheres.

The promoted charcoal catalyst may be prepared by an intimate mixing of the desired proportion of the inorganic acid or inorganic salt with the charcoal. For example, a finely comminuted activated charcoal is mixed with 10–20% of mono-calcium acid phosphate which is likewise in comminuted form. After a thorough mixing of the two, the resultant composition is pilled, in the usual type of pilling machine, and in that form is ready for catalyzing the reaction. It will be realized that by so preparing the charcoal catalyst there is exposed to the reactant gases a proportion of charcoal surface and of the promoter surface substantially equal to the ratio of these ingredients employed. Alternatively when using a liquid acid as a promoter the reaction may be conducted by mixing the acid, for example, phosphoric acid with methanol and injecting this mixture, together with carbon monoxide, into a reaction chamber filled with charcoal. By thus effecting the reaction the full advantage of the promoting ability of the phosphoric acid on the charcoal catalyst is realized and an excellent conversion of the reactants to acetic acid results.

Not only can methanol be catalyzed in the presence of carbon monoxide and my catalyst to acetic acid or the condensation product of the acetic acid with methanol, i. e. methyl acetate, but the higher alcohols, such as ethyl alcohol, propyl alcohol, butyl alcohol, and even the higher molecular weight alcohols, such for example as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition. When converting the higher aliphatic alcohols, some of which are not water soluble, and particularly if water is desired in the reaction, it is preferable to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohol the ether or ester thereof, the use of which will modify, to some extent, the type of product obtained.

I will now describe a specific embodiment of my process, but it will be understood that the details therein given and the compounds employed, either as reactants or catalysts, in no way restrict the scope of this invention, but merely illustrate one manner in which my process may be carried out.

*Example 1.*—A gaseous mixture containing 85% carbon monoxide and 5% each of methanol, water vapor, and hydrogen, is passed over a monocalcium acid phosphate promoted charcoal catalyst prepared as indicated above under a pressure of 700 atmospheres and at a temperature of 300° C. The catalyst is disposed in a a suitable chamber for the carrying out of exothermic gaseous reactions. The condensate obtained upon the cooling of the converted gases contains a high percentage of free acetic acid together with some methyl acetate and unconverted methanol.

*Example 2.*—Ethanol is thoroughly mixed with approximately 5% phosphoric acid. The resulting mixture is forced into a reaction chamber containing activated charcoal wherein it is held at a temperature of 300° C. and a pressure of 700 atmospheres. Carbon monoxide is drawn into the chamber together with water vapor in such amounts that the concentration of the vapors entering the chamber is approximately 85% carbon monoxide, 5% ethanol and phosphoric acid, 5% water, and 5% inert gases. The condensate obtained by condensing the vapors issuing from the chamber contain a high percentage of free propionic acid plus propionic esters.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces thereof with chromium or silver or using for the construction of this equipment acid resisting high alloy steels containing, for example, high molybdenum, cobalt, tungsten, chromium, manganese, or nickel content.

From a consideration of the above specification it will be realized that any process in which a carbon oxide is combined with an organic compound giving a product containing a negative radical of an aliphatic acid, and particularly those in which monohydric alcohols are converted to monocarboxylic acids, will come within the scope of this invention when such reactions are accelerated in the presence of a promoted charcoal catalyst.

I claim:

1. A process for the preparation of aliphatic organic acids which comprises contacting a compound selected from the group consisting of monohydroxy aliphatic alcohols, the alkyl ethers and the alkyl esters, with an activated charcoal catalyst promoted with a compound substantially not reducible under the conditions of operation, the acidity of which is due to the presence of a titratable hydrogen ion, in the presence of carbon monoxide at reacting temperature.

2. A process for the preparation of aliphatic organic acids which comprises contacting an aliphatic alcohol which is not substantially decomposed when vaporized with an activated charcoal catalyst promoted with a compound substantially not reducible under the conditions of operation, the acidity of which is due to the presence of a titratable hydrogen ion, in the presence of carbon monoxide at reacting temperature.

3. A process for the preparation of aliphatic organic acids which comprises contacting a monohydroxy aliphatic alcohol which is not substantially decomposed when vaporized with a supported activated charcoal catalyst promoted with a compound substantially not reducible under the conditions of operation, the acidity of which is due to the presence of a titratable hydrogen ion, in the presence of carbon monoxide at reacting temperature.

4. A process for the preparation of acetic acid which comprises contacting methanol with an activated charcoal catalyst promoted with a compound substantially not reducible under the conditions of operation, the acidity of which is due to the presence of a titratable hydrogen ion, in the presence of carbon monoxide at reacting temperature.

5. A process for the preparation of aliphatic organic acids which comprises passing carbon monoxide through an aqueous monohydroxy aliphatic alcohol solution and subsequently contacting the resultant vapor at an elevated temperature and pressure with an activated charcoal catalyst promoted with a compound substantially not reducible under the conditions of operation, the acidity of which is due to the presence of a titratable hydrogen ion.

6. A process for the preparation of aliphatic organic acids which comprises adding to a liquid aliphatic alcohol an inorganic acid substantially not reducible under the conditions of operation and subsequently injecting the resulting mixture into a reaction chamber containing an activated charcoal wherein it is subjected to an elevated temperature and pressure.

7. A process for the preparation of acetic acid which comprises passing methanol and carbon monoxide at an elevated temperature and pressure over an activated charcoal catalyst promoted with a compound substantially not reducible under the conditions of operation, the acidity of which is due to the presence of a titratable hydrogen ion.

8. A process for the preparation of acetic acid which comprises passing methanol and carbon monoxide at an elevated temperature and pressure over a supported activated charcoal catalyst promoted with a compound substantially not reducible under the conditions of operation, the acidity of which is due to the presence of a titratable hydrogen ion.

9. A process for the preparation of acetic acid which comprises passing methanol and carbon monoxide at an elevated temperature and pressure over an activated charcoal catalyst promoted with monocalcium acid phosphate.

10. A process for the preparation of propionic acid which comprises adding to an ethanol solution approximately 5% of phosphoric acid and subsequently injecting the resulting mixture into a reaction chamber containing activated charcoal.

11. In a vapor phase process for the preparation of aliphatic organic acids from organic compounds containing at least one hydrolyzable alkoxy group and carbon monoxide, the steps which comprise adding to a compound containing at least one separate alkoxy group an inorganic acid which is substantially not reducible under the conditions of operation, and subsequently injecting the resulting mixture into a reaction chamber containing activated charcoal.

12. In a vapor phase process for the preparation of aliphatic organic acids from organic compounds containing at least one hydrolyzable alkoxy group and carbon monoxide, the steps which comprise adding to a compound containing at least one separate alkoxy group an inorganic acid which is substantially not reducible under the conditions of operation and subsequently injecting the resulting mixture into a reaction chamber containing a promoted activated charcoal catalyst.

13. In a process for the preparation of acetic acid from methanol and carbon monoxide in the vapor phase, the steps which comprise adding phosphoric acid to methanol and subsequently injecting the resulting mixture into a reaction chamber containing an activated charcoal catalyst promoted with phosphoric acid.

14. In a vapor phase process for the preparation of aliphatic organic acids from compounds containing at least one hydrolyzable alkoxy group and carbon monoxide, the step which comprises effecting the reaction in the presence of an activated charcoal catalyst promoted with a compound of an acidic nature, the acidity of the compound being due to the presence of a titratable hydrogen ion, and the compound being substantially not reducible under the conditions of operation.

15. A process for the preparation of aliphatic organic acids which comprises contacting a compound containing at least one hydrolyzable alkoxy group with an activated charcoal catalyst promoted with a compound substantially non-reducible under the conditions of operation, the acidity of which is due to the presence of a titratable hydrogen ion, in the presence of carbon monoxide at reacting temperature.

16. In a process for the preparation of acetic acid from methanol and carbon monoxide in the vapor phase in the presence of an activated charcoal catalyst, the step which comprises preliminarily passing the carbon monoxide through an aqueous methanol solution.

17. In a process for the preparation of saturated aliphatic monocarboxylic acids from saturated monohydroxy aliphatic alcohols and carbon monoxide in the vapor phase in the presence of an activated charcoal catalyst, the step which comprises preliminarily passing the carbon monoxide through an aqueous monohydroxy aliphatic alcohol solution.

18. In a process for the preparation of aliphatic organic acids from compounds containing at least one hydrolyzable alkoxy group and carbon monoxide in the vapor phase in the presence of an activated charcoal catalyst, the step which comprises preliminarily passing the carbon monoxide through an aqueous solution of a compound containing at least one hydrolyzable alkoxy group.

GILBERT B. CARPENTER.